June 9, 1942.  A. W. KNUTSON  2,286,098
SAW TREATING MACHINE
Filed Dec. 13, 1939  3 Sheets-Sheet 1
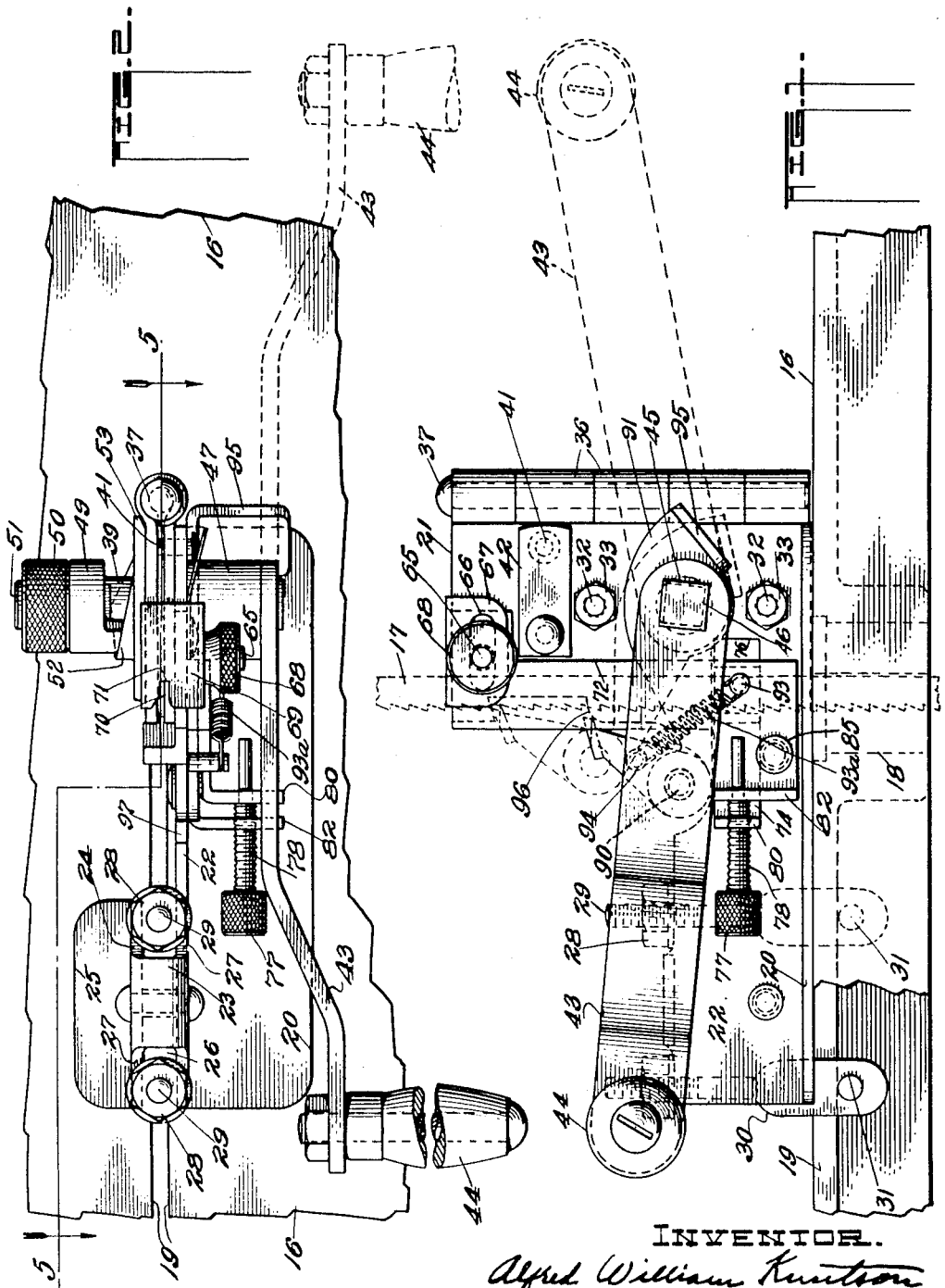
INVENTOR.
Alfred William Knutson

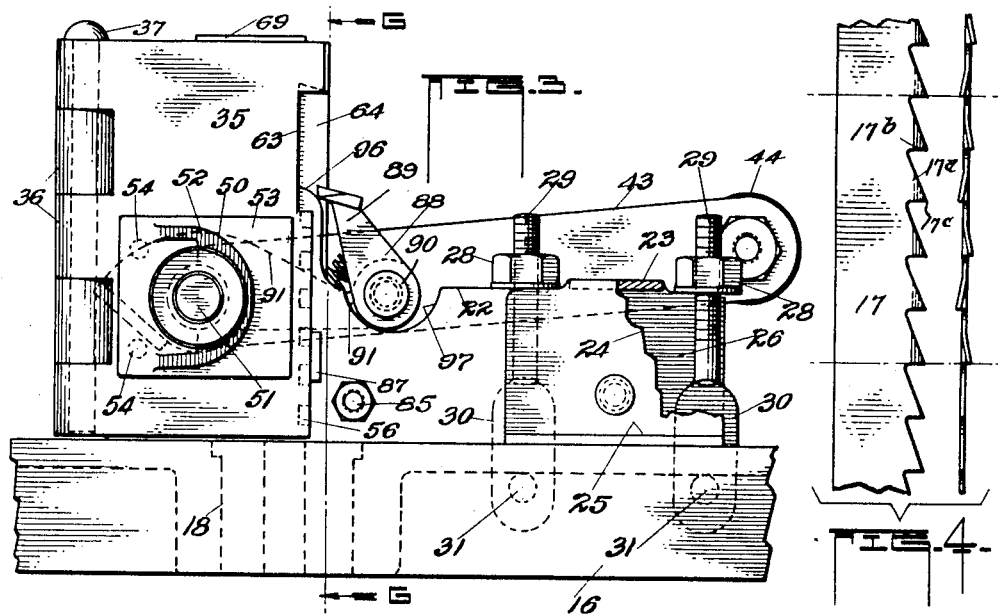
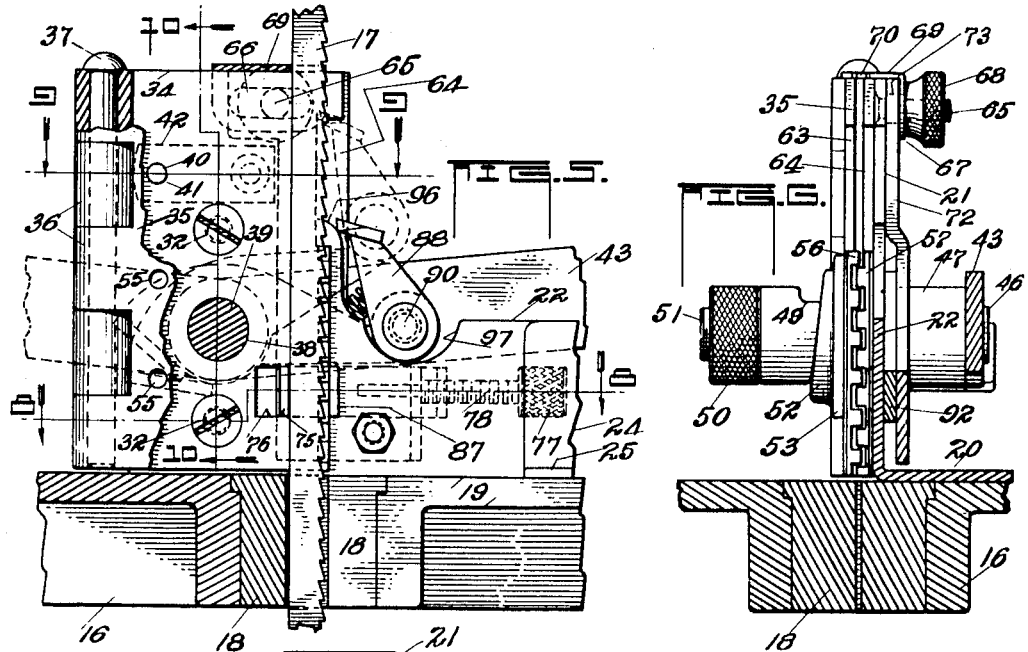
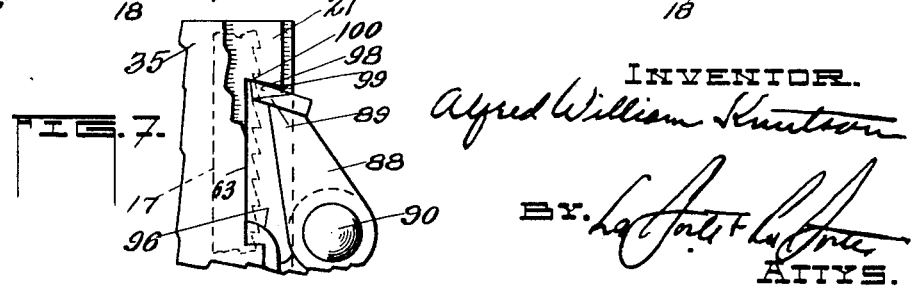

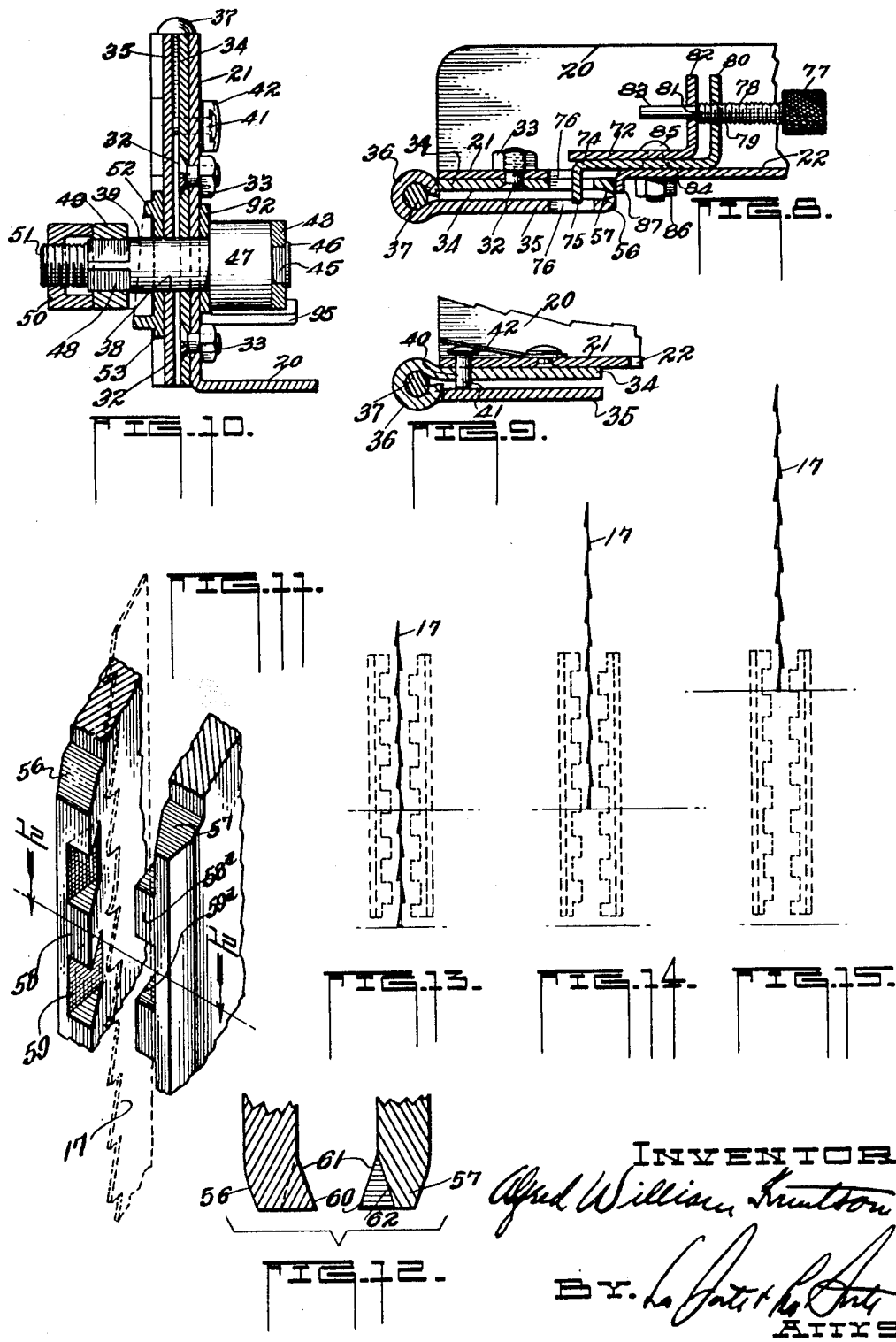

Patented June 9, 1942

2,286,098

UNITED STATES PATENT OFFICE 2,286,098

SAW TREATING MACHINE

Alfred William Knutson, Geneseo, Ill., assignor of one-half to Frank H. Brown and one-half to Edna Knutson Whited, both of Geneseo, Ill.

Application December 13, 1939, Serial No. 308,939

2 Claims. (Cl. 76—61)

This invention relates to improvements in saw treating machinery which, while useful in other connections, is primarily designed for expeditious and efficient setting of the teeth of saws.

In so far as the disclosure herein is common to the disclosures made in my copending applications, Serial Numbers 275,030, filed May 22, 1939, and 279,950, filed June 19, 1939, both relating to devices for setting band saw teeth, the instant application is in part a continuation of said applications.

The object of the invention is to provide a device that may be attached to standard or other band saw machines to enable the setting of the teeth of the saw without dismantling the latter from the machine.

Subordinate objects of the invention comprise improved attaching and supporting means for the setting mechanism, adapted to removably mount the setting mechanism in operative relationship to the saw; improved teeth setting mechanism; improved actuating means for forcibly and adjustably closing the setting mechanism onto the teeth to be treated and for opening said mechanism to free the saw for movement into and out of the operating zone of the setting mechanism; and improved means for effecting such movement or feed of the saw in timed relation to the functioning of the setting mechanism.

More specifically, the invention embraces—

A novel type of feed device adapted to engage the teeth of a saw to cause movement of the latter with reference to treating mechanism or devices, associated with instrumentalities to prevent movement of the saw beyond a predetermined distance, thereby avoiding disalignment of the treating devices with the teeth of the saw intended to be treated;

A pair of movably related plate-like members possessing opposite edges formed with teeth-treating devices of a given number per given measurement lengthwise of the saw to be treated, preferably formed with a feed-way aligned with said treating devices;

Said plate-like members also preferably formed for novel detachable association with a portion of the framework of the machine whereby to be removable therefrom for the purpose of enabling substitution of another unit therefor, such substitute unit comprising removably related plate-like members possessing a different number of teeth-treating devices so that saws of relatively even and uneven numbers of teeth in the given measurement of the length of the saw,—as so many teeth per inch,—may be treated in the same machine by a simple application of the appropriate teeth-treating unit;

Novel actuating means adapted to effect feed of a saw, either of the stated even or uneven number of teeth, combined with means whereby said actuating means will also manipulate the plate-like members to treat the teeth of the saw within the operating zone of the latter at times intermediate a feed of the saw relative thereto; and A novel manually operable device forming part of the actuating means for effecting the feed, formed and arranged to be oscillated through a predetermined arc of movement, to, in one direction, cause the feeding of the saw, and in the reverse direction, cause the forcing of the treating devices together,—onto the teeth to be treated,—and preferably the correlated parts being formed and arranged to permit successive actuations of the feeding means without actuating the setting or treating devices.

The invention embraces many additional details of improvement in individual parts, and combinations of parts, incorporated in the machine, all lending to successful operation of the machine, ease and cheapness of its manufacture, and simplicity of its structure and arrangement. The foregoing will be apparent to persons skilled in the art to which the invention pertains, from a consideration of the detailed description of the machine, hereinafter contained, when read in connection with the accompanying drawings forming a part hereof, and wherein the preferred embodiment of the invention is illustrated.

In said drawings—

Figure 1 is a front or face view of my improved setting mechanism removably secured to the bed of a machine in operative relationship to the band saw of the latter to treat the teeth of said saw;

Figure 2 is a top view of the combination illustrated in Figure 1, the bed of the band-saw machine being shown fragmentarily in both instances;

Figure 3 is a rear view of the setting mechanism, parts being broken away;

Figure 4 is a composite elevation and edge view illustrative of a No. 6 pitch band saw, certain portions of the teeth of which have been set and succeeding portions of the teeth of which are to be set and engaged to feed the saw in the saw-setting mechanism of the preceding figures;

Figure 5 is a vertical sectional view to better illustrate parts of the mechanism not seen in Figure 3, the band saw being shown in position in this Figure 5;

Figure 6 is a vertical sectional view on a line generally illustrated by 6—6 of Figure 3, and showing the inner edges of the plate-like members with the oppositely-disposed setting devices formed on said edges;

Figure 7 is an enlarged detail view of the feeding dog or pawl and immediately associated parts, to illustrate means for preventing escape of the pawl from the teeth of the saw and whereby to stop the movement of the saw beyond the point marking the limit of feeding movement of the pawl;

Figure 8 is a longitudinal sectional view on the line 8—8 of Figure 5, to illustrate the feature of a gauge or stop bridging the space between the closed plate-like members to engage the back of the saw in properly locating the same with reference to the treating devices at the outer edges of said members;

Figure 9 is a similar view approximately on the line 9—9 of Figure 5, to illustrate a means for relatively forcing the plate-like members to open position when the saw is to be released from the setting or treating devices and shifted with relation to the latter to present additional teeth in the zone of operation;

Figure 10 is a vertical sectional view generally on the line 10—10 of Figure 5, through the plate-like members and showing the actuating shaft passing therethrough, parts associated with the latter being also shown in section;

Figure 11 is an enlarged sectional view in perspective of portions of the complemental setting edges of the plate-like members;

Figure 12 is a detail sectional view on the line 12—12 of Figure 11, further illustrating said complemental setting edges of the plate-like members; and Figures 13, 14 and 15 are diagrammatic views illustrating the plate-like members provided with an uneven number of complemental setting devices, say, for illustration, five per inch of the lengthwise measurement of the toothed edge of the No. 6 pitch band saw to be treated, the toothed edge of such a saw being illustrated in full lines in each of the views, and in Figure 13 perfect registration of the saw teeth with the setting devices being indicated, in Figure 14 disalignment of said teeth with the setting devices being indicated following a one-inch feed of the saw, and in Figure 15 the teeth of the saw being again indicated in perfect alignment with the setting devices after a two-inch feed of the saw.

Referring more particularly to the drawings, wherein like numerals designate the same parts in the several views, 16 is the metallic table or bed of a standard or other band saw machine provided with the customary band saw, as represented at 17, usually having its runs vertically of the machine, the downward run passing through the relatively soft guard 18 inserted in said bed and opening to a slotted portion 19 of the latter, which normally permits the band saw to slip therethrough into the guard 18.

I utilize the slotted portion 19 of the bed or table as a means affording firm attachment of my improved saw treating mechanism thereto in operative association with the band saw, 20 is a bottom supporting flange of the frame of said mechanism, the same being of substantially elongated character and of sufficient width for the purpose, this flange 20 being turned outwardly from an upstanding supporting member 21 of substantial height, integral with an elongated extension 22 of considerably less height, in turn inwardly attached by a top connection 23 with a spaced parallel member 24 terminating in an offset bottom flange 25 in the plane of the flange 20.

It will be observed that the top connecting portion 23 bridging the space 26 between the parallel members or walls 22 and 24 is shorter than the latter so as to leave seats 27 therebeyond at both ends of these walls. These seats are for the purpose of accommodating binding nuts 28 having threaded engagement with bolts 29 formed with flattened portions 30 to fit the slotted portion 19 of the bed or table and extend therebelow, these flattened portions, in turn, possessing laterally projecting anchor lugs or suitable enlargements 31 adapted to engage below and impinge upon the under surface of the top of the bed or table 16 when the nuts 28 are threaded or turned home, whereby the setting mechanism will be rigidly bound to the base or table at substantially separated points not only to prevent longitudinal movement therebetween but also any tendency of the setting mechanism to shift laterally.

It will be understood that the flattened portions of the bolts may be slipped through the slotted portions 19 and the bolts 29 rocked upwardly through the open ends of the walls 22 and 24 so that the nuts 28 may be applied thereto.

With the framework of the mechanism rigidly secured in position and understood as above defined, the operating mechanism mounted on such framework will now be described.

Secured by screws 32 passing through the upstanding supporting member 21 and engaging the nuts 33, is the inner plate member 34 of a pair of such plates, the outer one of which is indicated at 35. These two plates 34 and 35 are hingedly connected together through the medium of aligned perforated ears 36 through which a hinge pin 37 passes. The plates, as well as the upstanding supporting member 21, are of substantial width and of approximately the same size to correspondingly afford adequate bracing or back support for the inner plate 34 toward which the outer plate 35 must be forced with adequate pressure to accomplish the setting operation.

The plates, as also the support 21, are apertured as at 38 to provide a common passage for a shaft 39 of what I will term a common actuator for the setting and feeding devices.

The inner plate 34 is also perforated, as at 40, for the passage of the pin or plunger 41 backed by a leaf spring 42 riveted to the upright supporting member 21, said pin being of a length to present its inwardly protruding end against the inner surface of the outer plate 35 and thereby, under the influence of the spring 42, exert a constant pressure against said outer plate to normally force the same open when the plate 35 is not otherwise restrained.

43 is the lever of the common actuator alluded to, the same being preferably provided at its outer end with a hand grip or handle 44 for manual operation. The inner end of this lever is fixed to the shaft 39 conveniently by a square fit 45 and held in place by upsetting the end of the shaft at 46, a bearing member 47 being also fixed to the shaft and disposed between the lever 43 and the member 21.

The end of the shaft 39 projects a considerable distance outwardly beyond the outer face of the plate 35 and is provided with a square or irregular portion 48 onto which is sleeved a cam member 49 to turn with the shaft, the cam member being held against escape from the shaft by a knurled nut 50 adjustably and removably engaging the threaded end 51 of the shaft and bearing against said cam member 49.

Between the cam member 49 and the outer plate 35 a complemental cam member 52 is fixed to said plate and sleeved on the shaft 39 to permit movement of the shaft in a rotary direction therewithin. The fastening of the cam member 52 against rotative movement is accomplished through the medium of a plate 53, with which the cam member 52 is integrally formed, and spaced pins or lugs 54 detachably engaging corresponding recessed portions or perforations 55 in the outer plate 35.

From so much of the description as appears above, it will be seen that the pressure between the cam members may be adjusted by manipulating the knurled nut 50 by the fingers of the operator and a nicety of control thereby easily afforded; also that upon removal of the nut 50 the cooperating cam members 49 and 52 may be removed from the shaft 39, and the shaft liberated for withdrawal from the opposite side of the plates. Furthermore, by simply freeing the screws 32 from their binding nuts 33, the assembly or unit constituted by the pivoted plates 34 and 35 may be detached from the machine and another unit substituted in its stead.

An additional instrumentality for adjusting the relationship of the cam members 49 and 52 is afforded by the squared connection 48 between the shaft 39 and the cam member 49 which enables said cam member 49 to be withdrawn from the shaft, turned a station, so to speak, in a direction circumferentially of the shaft, and reapplied to the shaft, with consequent change in the facial contact of the cams relative to each other.

At the free edges of the hinged plates 34 and 35 are provided, preferably by integral formation therewith, series of correlated saw-setting devices 56 and 57, comprising male portions 58, 58ª, and female portions 59, 59ª, in staggered relationship, to afford a staggered fit capable of alternately offsetting the teeth of a saw in opposite directions.

The outer edges 60 of the male members protrude the desired offsetting distance from the adjoining faces of the plates and are joined by bevelled or inclined faces 61 with said faces of the plates; and the female portions incline from said inner faces of the plates towards the outer faces thereof to a depth approximately equal to the extent of projection of the male members from said inner faces.

The bottom walls 62 of the female portions incline from the edges of the plates to their inner surfaces in general correspondence with the inclination of the projected walls 61 of the male members, but vary in slight degree of inclination therefrom to avoid gripping the entire body of the tooth interposed therebetween in the setting operation, thereby allowing opportunity for some play of the metal constituting the tooth.

The number of setting devices in the correlated series at the edges of the plates may be varied by substitution of different sets of plates in the machine.

Aligned with the series of teeth formed at the edges of the plates 34 and 35 and thereabove, said edges are recessed or set back as at 63 to provide a feed-way 64 to accommodate the movement of feeding means for the saw, said way being of a depth at least equal to the length of the teeth of the saw to be treated, and the extent or length of the way being less than the extent of the series of setting devices, so that an untreated portion of the saw teeth may not at any time escape treatment in the operation of the machine.

To insure proper presentation of the saw to the setting devices and/or the feeding means, suitable guides or stops are associated with the plates 34 and 35 adapted to occupy relatively aligned positions substantially in alignment with the inner end of the slot in the guard 18, whereby to engage the back edge of the saw in limiting the inward positioning of the latter between the plates. Said stops or guides may be now respectively described.

First, the upper stop: Rigidly attached to the upstanding supporting member 21 is an outwardly projected threaded stud 65 on which the slotted portion 66 of the depending flange 67 of an angle bar fits for lengthwise adjustment, a thumb nut 68 threaded to the end of the stud 65 being utilized to clamp the angle bar in any position desired within its range of adjustment. The top flange 69 of the angle bar extends horizontally over the upper edges of the upstanding supporting member 21 and the inner plate 34, and the outer plate 35 is adapted to slip under the flange 69 when the plate 35 is in closing or closed position.

The upper flange 69, in registration with the space therebelow and between the plates 34 and 35 when said plates are closed, is cut out at 70, the opposite edges of the cut-out portion being bevelled or rounded to diverge towards the free edges of the plates to facilitate the entrance of the saw blade therebetween, and the back edge 71 thereof being disposed to engage the back edge of the saw in limiting the insertion of the saw between the plates and towards the hinged edges thereof.

Between the supporting member 21 and the depending flange 67 of the angle bar constituting the top guide or gauge, the upper end of an L-shaped support 72 is interposed, the same being provided with an aperture 73 fitting loosely over the stud 65, previously referred to, so that the thumb nut 68 has the additional function of firmly holding this L-shaped member in place at said upper end.

The bottom stop: The bottom stop or gauge is operatively associated with the lower end or shorter arm of the L-shaped support 72 and comprises a slidable member 74 free to move between the flange or wall 22 and the L-shaped support 72 and having an inwardly turned stop flange 75 positioned to move through the upstanding support 21 and through the inner plate 34 and into the outer plate 35 when the latter is in closed position, registering with wide openings 76 being provided to this end.

It will be appreciated that when the outer plate 35 is in closed position the flange 75 will bridge the space between the plates and constitute a positive barrier against too great insertion of the saw between the plates. The width of the openings 76 is such that a substantial range of adjustment of the flange 75 may be obtained.

The adjustment of the stop flange 75 is accomplished by finger manipulation of the knurled head 77 of the screw 78 which has threaded engagement at 79 with the outstanding flange 80 of the slide 74, said screw having a shouldered abutment at 81 with a similarly outstanding and parallel flange 82 at the end of the short arm of the L-shaped support 72. A somewhat elongated terminal 83 of the screw passes freely through the flange 82.

The slide 74, in its adjusting movements, simply rides over a spacing washer or enlargement 84 of a bolt or stud 85 suitably spacing the flange 22 and the L-shaped support 72, a nut 86 threaded to the end of the bolt or stud and impinging upon the outer face of the flange or wall 22 holding the parts in operative relationship.

87 is a lug or flange on the wall 22 occupying a position at the edge of the inner plate 34 and opposite the stop flange 75 to assist in preventing escape movement of the saw from between the plates 34 and 35 when the latter are in open position, as well as to assist in locating the saw in appropriate registration with the treating devices to operate on the teeth thereof.

The feeding means will now be specifically considered: The teeth of the saw under treatment are availed of in the feeding operation of the saw to advance the teeth thereof,—in successive series,—to and beyond the zone of operation of the treating devices. It will be seen (in Figure 5, for example) that a pawl 88 is mounted in operative relationship with said teeth, the pawl being provided with a feeding tooth 89 to engage the substantially straight forward bottom edge of a tooth, thereby constituting an interlocking arrangement so that the saw will be lifted by the pawl.

The pawl 88 is pivoted at 90 to a lever 91, the intermediate portion 92 of which is pivoted on the shaft 39 between the bearing 47 of said shaft and the upstanding supporting plate 21 (Figure 10), to permit, at times, free and independent rocking movement of the shaft. To the L-shaped supporting member 72 a spring 93$^a$ is attached at 93, the opposite end of the spring being attached at 94 to the pawl in position to exert a constant tendency to draw the pawl towards the teeth of the saw as well as to pull down the pawl and connected end of the lever 91 to the position they occupy just prior to starting a feed of the saw. The opposite end of the lever 91 is outwardly offset to provide an abutment 95 positioned to be engaged by the near edge of the primary or common-actuator lever 43 of the machine, and by such engagement to swing the lever 91 downwardly at said end, forcing the pawled end of the lever upwardly, and overcoming the pull of the spring 93$^a$.

From the foregoing disclosure of the structural characteristics of the feeding means, it will be appreciated that the actuating lever 43 when occupying a position with its handle or grip 44 disposed at the left (viewing the machine as represented in Figures 1 and 2), will have no influence, whatever, on the feeding lever 91 loose on the actuator shaft 39, so that the spring 93$^a$ will have pulled the pawl end of the lever 91 downwardly into its lowermost position, with the accompanying retraction of the pawl to its lowest or initial feed location. The tooth 89 of the pawl, for the time being, is held away from the saw teeth by the cam surface 96 on the edge of the upstanding supporting member 21 over which the tooth 89 of the pawl is adapted to ride. When, however, the actuator lever 43, in the oscillation thereof, is moved to the right-hand position (as indicated by dotted lines in Figures 1 and 2), the edge of the lever 43 will abut the outstanding part 95 of the lever 91. In the continued downward movement of the lever 43, the then engaged part 95 and adjoining end of the lever 91 will be depressed, correspondingly raising the other end of the lever 91. This action overcomes the spring 93$^a$, and causes the pawl to ride in the reverse direction up and over the cam 96 and into interlocking engagement with the tooth of the saw confronting the same. The pawl will be forced on upwardly, carrying the saw 17 with it to the extent marked by the upper end of the way 64 at the edge of the associated plates 34 and 35, located above the series of teeth-treating devices and in approximate alignment therewith, as has been previously pointed out.

The flange or wall 22 extended upwardly from the supporting base flange 20 has a widely curved recess 97 in the upper edge thereof for the accommodation of the pivoted end of the pawl and its carrying lever 91 and to allow for the swinging play of them to and fro with reference to the saw teeth, best seen in Figures 3 and 5 of the drawings.

In the treatment of the teeth of a saw of the band-saw type wherein teeth are relatively fine and immediately adjoin each other by an inclined wall 17$^a$ extending from the base of the substantially straight cutting edge 17$^b$ of one tooth to the peak or point 17$^c$ of the adjoining tooth, it is to be observed that when the actuator lever 43 is manipulated to throw the pawl 88 upwardly and carry the saw along with it, momentum may at times have a tendency to cause the saw to feed unduly, that is, slightly beyond, or over-running, the necessary position of registration of the series of teeth to be treated with the complemental setting or treating devices. On such occasions, unless provision be made thereagainst, the continued movement of the saw would cause the adjoining inclined edge 17$^a$ of the tooth immediately below that which has been engaged by the pawl, to wedge the pawl away from the teeth. In other words, the tendency of the saw to overfeeding movement would not be restrained by any coaction between the pawl and engaged tooth. Therefore, I provide the pawl with an upwardly projecting lug 98 having a downwardly and outwardly inclined top edge 99 formed to engage a corresponding inwardly and upwardly extending edge 100 of the upstanding supporting plate member 21. These edges are adapted to set up a wedging action forcing the pawl,—when reaching the extreme upper limit of its feeding movement,—inwardly towards the saw, so that the said inclined edge of the saw cannot free the pawl. This wedging action also tends to bind the saw at its rear and toothed edges between the bottom 71 of the top gauge and the tooth 89 of the pawl. Thus, the saw cannot move beyond the point of stoppage of movement of the feeding pawl, itself.

The range of movement of the feeding pawl with the corresponding shift of the saw is by measured distance, for example, one inch, in keeping with the same accurate measurement lengthwise of the saw; because such saws are ordinarily manufactured by pitch, so-called, that is, say, four, five, six or seven pitch, etc., and wherein the actual number of teeth per inch of the saw is one tooth less than the designated pitch. To make this clear, by examples, a saw of seven pitch teeth per inch will possess six teeth; a saw of five pitch teeth per inch will possess four teeth per inch; etc.

Now, remembering that my machine possesses an actuator of permanent type for feeding any saws by uniform steps to and out of the setting devices, namely, in correspondence with a measured length of the saws, say the one inch length thereof, some care must be exercised to insure registration of the teeth of the saw, whether of even or uneven number, with the saw's complemental setting or treating devices.

For the above stated purpose of insuring registration of teeth I provide a number of interchangeable sets of the movably related plates 34 and 35 in which the setting devices are formed in odd or even numbers, as the case may be, but all of which plates are provided with a uniform length of way for the common feeding mechanism. The series of setting or treating devices on each plate is of an extent at least twice that of the extent of the feeding movement of the saw with reference to the plates. For instance, the feeding movement being for the exact or measured one inch, the setting devices will be of an extent of at least two inches and possibly a little more, so that any tooth to be treated cannot under any conditions escape treatment in the treating zone of the setting or treating devices.

The reason for the long or double series of treating devices, relative to the extent or distance of feed, is because the male and female portions of the coacting setting devices alternate throughout the series of setting devices and the feeding of the saw teeth must be such as not to prevent registration in the instance of uneven teeth per inch. Otherwise some of the teeth supposed to offset in one direction may be forced in a contrary direction and thereby damaged when engaged by the setting devices. In these circumstances, while by my common and uniform feeding mechanism saws of even numbers of teeth per inch may be alternately fed and set; saws of odd numbers of teeth per inch must have a double feed intervening between setting operations.

Described otherwise, when a saw of even number of teeth per inch is being treated, the feed thereof will be for one inch only, followed by a setting operation, then by a feed for another inch, followed by a setting operation, and so on. However, where a saw of an odd number of teeth is to be set, said saw, after the initial proper introduction of the saw between the setting devices to start the operation and following the first setting operation, must have a duplicated feed, that is, a feed for two inches between successive setting operations. This may be accomplished under the special arrangement of the common actuator for the cams that press the setting devices together or against the teeth, in relation to the feeding means for advancing the latter.

Assuming that following a setting operation the actuator lever 43 is at the left (Figure 1), a raising of said lever to an approximately vertical position and consequent disengagement of the cams 49 and 52 will free the setting devices coincidently with the opening of the plates 34 and 35 under the influence of the spring-pressed plunger 41. The throwing of the lever downwardly to the dotted line position of Figure 1 will effect the feed of the saw 17 to the extent of the predetermined accurately measured distance (as one inch), as indicated in dotted lines. Instead of continuing the oscillation of the lever to its extreme position at the left to again and alternately press the setting devices together, said lever will in this instance (of treatment of odd number of teeth) be thrown downwardly from the approximately vertical position thereof a second and immediately successive time so as to obtain a double actuation of the feed, thereby shifting the saw the correspondingly double distance before the setting mechanism is again operated. Through this double feeding operation, the appropriate male and female portions of the setting devices, will have come into registration with the teeth of the saw intended to be treated thereby, and the setting devices may thereupon operate with safety.

The theory of the foregoing double feed of a saw possessing odd numbers of teeth, in given measurement lengthwise of the saw, will be apparent from an inspection of the diagrammatic representation of Figures 13, 14, and 15, wherein the male and female portions of the setting devices are in truly alternating or staggered relationship and the saw to be treated possesses the stated odd number of teeth.

Introducing the saw between the setting devices (Figure 13) will, at the outset, of course, present perfect registration between the teeth to be treated and the setting devices. If the saw is shifted merely to the extent of one feeding actuation (Figure 14), it will be seen that the teeth intended to be offset will be opposed by the male members of the setting devices instead of the reverse, resulting in lack of registration. However, if the saw is given a double feed (say the two inches) intervening setting operations, it will be seen (Figure 15) that the appropriate registration of the teeth of the saw with reference to the correct male and female portions of the setting devices has been accomplished.

While I have herein disclosed a practical and the preferred embodiment of my invention, it will be understood that many changes in matters of detail or arrangement may be resorted to without departing from the spirit of the invention as outlined in the hereto appended claims.

I claim:

1. In a saw setting machine, a pair of movably related plates having correlated setting portions at one edge of the plates and near one end of the plates, feeding means adjacent said edge of the plates and nearer the opposite end of the plates adapted to engage the teeth of the saw, means for locating the saw in operative relationship to the setting and feeding means including a combined stop and guide comprising a notched member adjustably secured to one of the plates and overhanging the other to present the notch in alignment with the feed of the saw, the end of the notch being disposed to engage the back of the saw in opposition to the direction of engagement of the feeding means with the toothed edge of the saw, and a limiting stop associated with the tooth-engaging means to definitely limit the amount of movement of the saw.

2. In a machine of the character described, opposed hingedly connected plates provided with guiding means for a toothed saw, and teeth-setting devices extending along complemental portions of one edge of said plates to simultaneously set several saw teeth, an adjacent portion of one edge of one of the plates being set back to constitute a way for a shifting pawl, a pawl for shifting said saw, said pawl being formed and arranged to engage a tooth of the saw, means for shifting the pawl in said way to correspondingly shift the saw intermittently through the setting zone, and a stop adjoining the outer end of said way to limit the shifting movement of the pawl upon each forward actuation thereof, in combination with means located between the way and the setting devices for predetermining the point at which the pawl may engage a tooth of the saw to cause forward movement thereof.

ALFRED WILLIAM KNUTSON.